United States Patent Office 3,424,753
Patented Jan. 28, 1969

3,424,753
METHOD FOR PREPARING 7-(β-HYDROXYALKYL-AMINO - γ - DIBUTYLAMINO - PROPYL)-THEO-PHYLLINES
Helmut R. Schafer, 2061 Kayhude, Germany
No Drawing. Filed Apr. 21, 1966, Ser. No. 545,525
Claims priority, application Germany, Apr. 30, 1965,
D 47,150
U.S. Cl. 260—256                                 7 Claims
Int. Cl. C07d 57/48; A61k 27/00

ABSTRACT OF THE DISCLOSURE

Compounds are prepared having the formula

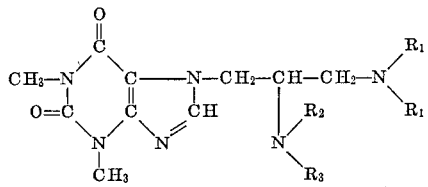

wherein $R_1$ is a butyl group, $R_2$ is a hydroxyalkyl group having up to 3 carbon atoms and $R_3$ is selected from the group consisting of alkyl having up to 3 carbon atoms and hydroxyalkyl having up to 3 carbon atoms, and $R_2$ and $R_3$ together with the adjacent nitrogen atom form a six membered heterocyclic ring having two nitrogen atoms therein, the other nitrogen atom of the ring having a hydroxyalkyl group attached thereto.

---

This invention relates to a method for preparing novel therapeutically useful theophylline derivatives having the general formula

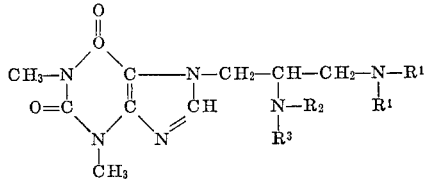

wherein $R^1$ is an alkyl group having 4 carbon atoms, preferably n-butyl or isobutyl, $R^2$ ise a hydroxyalkyl group having up to 3 carbon atoms, and $R^3$ is an alkyl or hydroxyalkyl group having up to 3 carbon atoms, or $R^2$ and $R^3$ together with the nitrogen atom and another hydroxyalkyl-substituted nitrogen atom form a heterocyclic ring.

It is known to react 7-(β,γ-epoxypropyl)-theophylline or 7-(β-hydroxy-γ-halopropyl)-theophylline with dialkyl amines to form the corresponding 7-(β-hydroxy-γ-dialkyl-amino-propyl)-theophyllines. German patent application DAS 1, 140, 194 and the corresponding British Patent 938,057 describe also the corresponding reaction with dibutylamine or diisobutylamine.

According to German Patent 1,018,869 it is further known to prepare 7-(β-dialkylamino-alkyl)-theophyllines or 7-[β-dialkylamino-β-(alkylamino - alkyl) - ethyl]-theo-phyllines by hydrogenation of the corresponding purine-ketone together with a primary amine or by reaction of the respective haloalkyl-purine with an amine.

According to British Patent 669,070 it is further known to react 7-haloalkyl-theophyllines with secondary amines to form 7-(dialkylamino)-alkyltheophyllines.

However, the aforementioned method fails in the case of 7-(β-chloropropyl)-theophylline where under the conditions of amination with cleavage of hydrogen chloride the 7-propenyl-theophylline is formed (H. Priewe and A. Poljak, Chemische Berichte, vol. 90, 1957, page 1651).

It has now surprisingly been found that a γ-dibutyl-amino-substituted 7-(β-chloropropyl)-theophylline can be converted by reaction with secondary hydroxyalkyl amines without undesirable side reactions to the corresponding β-hydroxyalkyl-amino derivatives. This reaction can even be carried out with a large excess of amines to obtain a high yield without a substantial cleavage of hydrogen halide occurring. The excessive amine can be substantially removed from the reaction mixture by distillation. The novel compounds prepared this way exhibit an excellent therapeutic effect on the vegetative nervous system and the cardiac and circulative functions.

Accordingly, the present invention provides a method for preparing therapeutically effective β-hydroxyalkyla-mino-substituted 7-(γ-dibutylamino-propyl)-theophyllines having the general formula

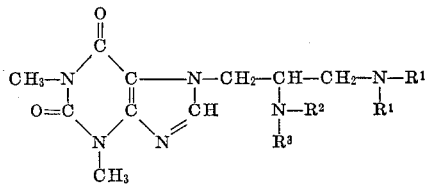

wherein $R^1$ is an alkyl group having 4 carbon atoms, preferably n-butyl or isobutyl, $R^2$ is a hydroxyalkyl group having up to 3 carbon atoms, and $R^3$ is an alkyl or hydroxyalkyl group having up to 3 carbon atoms, or $R^2$ and $R^3$ together with the nitrogen atom and a further hydroxyalkyl-substituted nitrogen atom form a heterocyclic ring, which is characterized in that a 7-(β-halo-γ-dibutylamino-propyl)-theophylline is reacted at temperatures in the range of 70–200° C., preferably 120–160° C., with preferably an excess of an amine having the general formula

wherein $R^2$ and $R^3$ have the meaning as defined above.

In a preferred embodiment of the mtehod of the invention, the 7-(γ-di-n-butylamino-β-chloropropyl)-theo-phylline or the 7-(γ-diisobutylamino-β-chloropropyl)-theophylline is reacted with an amine wherein $R^2$ is a β-hydroxyethyl group or a β-hydroxypropyl group and $R^3$ is a methyl, ethyl or β-hydroxyethyl group. As heterocyclic amine, especially the 4-(hydroxyethyl)-piperazine can be used.

The 7-(β-halo - γ - dibutylamino-propyl)-theophyllines and in particular the 7-(β-chloro-γ-diisobutylamino-propyl)-theophylline used as starting material in the method of the invention can be prepared in a manner known per se, in particular by reaction with thionyl chloride, optionally in the presence of hydrogen chloride, from the respective 7-(β-hydroxy-γ-dibutylamino-propyl)-theophyllines. These in turn are obtained by reacting theophylline in the form of its potassium salt with a condensation product of a dibutylamine and epichlorohydrine, or according to the method described in German Patent 1,140,194, or also from 7-(β - hydroxy-γ-aminopropyl)-theophylline. Condensation products of equimolecular amounts of epichlo-rohydrine and secondary amines can be prepared by the method described in Houben-Weyl, volume XI/1 (1957), pages 323/24. When preparing such condensation products from epichlorohydrine and strongly basic amines, the use of higher temperatures should be avoided since they otherwise are said to be instable. When reacting equimolar amounts of epichlorohydrine with diisobutylamine in alcoholic solution, however, the 3-chloro-2-hydroxy-diiso-butylamino-propane is surprisingly obtained only after several hours reflux boiling without any decomposition in a yield of more than 90%.

With the method of the invention, in particular the following theophylline derivatives can be prepared:

7[β-(methyl-β'-hydroxyethylamino)-γ-diisobutylamino-propyl]-theophylline,
7[β-(ethyl-β'-hydroxyethylamino)-γ-diisobutylamino-propyl]-theophylline,
7[β-(bis-β'-hydroxyethylamino)-γ-diisobutylamino-propyl]-theophylline,
7[β-(bis-β'-hydroxypropylamino)-γ-diisobutylamino-propyl]-theophylline,
7[β-(4'-β''-hydroxyethyl-piperazino)-γ-diisobutylamino-propyl]-theophylline,
7[β-(methyl-β'-hydroxyethyl-amino)-γ-di-n-butylamino-propyl]-theophylline,
7[β-(ethyl-β'-hydroxyethylamino)-γ-di-n-butylamino-propyl]-theophylline,
7[β-(bis-β'-hydroxyethylamino)-γ-di-n-butylamino-propyl]-theophylline,
7[β-(bis-β'-hydroxypropylamino)-γ-di-n-butylamino-propyl]-theophylline,
7[β-(4'-β''-hydroxyethyl-piperazino)-γ-di-n-butylamino-propyl]theophylline.

The 7-(β-hydroxyalkylamino-γ-dibutylamino-propyl)-theophyllines made by the method of the invention are characterized by valuable therapeutic properties and are in their efficiency substantially superior to the known theophylline derivative of similar structure. The theophylline derivatives made by the method of the invention have a special effect on the vegetative nervous system. Thus when using e.g. in the Langendorff cardiac test 0.028 mg. of 7-[β-(methyl-β'-hydroxyethyl-amino-γ-diisobutylamino-propyl]-theophylline as described in the following Example 1 or 0.042 mg. of 7-[β-(bis-β'-hydroxyethyl)-amino-γ-diisobutylamino-propyl]-theophylline as described in Example 2 the same improvement of the coronary circulation is obtained as with 0.148 mg. of the 7-(β-benzoylhydroxy-γ-diisobutylamino-propyl)-theophylline described in DAS 1,140,194 or with 2.0 mg. of theophylline. This improved coronary circulation continues for 5.6 to 6.6 minutes when using the compounds made according to the invention while it dies away already after 4.6 to 4.0 minutes when using the known compounds.

The degree of spasmolytic effect of the products of the invention, e.g. in histamine spasm, was compared with that one of known materials on isolated guinea-pig intestine in the test designed by Magnus. In these tests for both compounds prepared according to Examples 1 and 2, i.e. 7-[β-(methyl-β'-hydroxyethyl)-amino- γ -diisobutyl-amino - propyl] - theophylline and 7-[β-(bis-β'-hydroxyethyl)-amino-γ-diisobutylamino-proyl] - theophylline, an efficiency of 10 was found, based on the efficiency 1 established for the known 7-[β-hydroxy-γ-(methyl-β'-hydroxyethylamino)-propyl]-theophylline-nicotinate.

In the diuresis test, the theophylline derivatives made according to the invention showed remarkably low threshold values of 10 to 40 mg., whereas e.g. the known 7-(β-benzoylhydroxy-γ-diisobutylamino - propyl)-theophylline shows no diuretic effect up to 100 mg.

These data show that the theophylline derivatives made according to the invention are superior to the known compounds of similar structure in several respects.

Due to their favorable therapeutic properties, the theophylline derivatives made according to the invention can be used in the treatment of cardiac and circulative diseases and may be employed for this purpose as such or in the form of their water-soluble salts.

The invention is further illustrated by the following examples:

Example 1.—7-[β-(methyl-β'-hydroxyethyl)-amino-γ-diisobutylamino-propyl]-theophylline A solution of 183 g. 7-(β-hydroxy-γ-diisobutylamino-propyl)-theophylline in 700 ml. chloroform was neutralized with hydrogen chloride, after addition of 89.3 g. thionyl chloride slowly heated to reflux and refluxed for 4 hours. Then the chloroform was removed by distillation in water jet vacuum, 750 ml. of water added to the residue, the base precipitated from the solution by addition of NaHCO₃ and dissolved in chloroform. Upon concentration of the Na₂SO₄-dried chloroform solution a residue of 185 g. crude product remained yielding after recrystallization from 1.6 l. petroleum ether 155.0 g. (81% of the theory) pure 7-(β-chloro-γ-diisobutylamino-propyl)-theophylline, M.P. 84–85° C.

38.4 g. of the β-chloro compound were dissolved in 77 g. methylamino-ethanol and boiled under reflux for 3 hours. The excess methylamino-ethanol was removed from the clear solution by distillation in water jet vacuum, the residue was dissolved in 200 ml. 10% hydrochloric acid, after dilution with 300 ml. water filtered over charcoal, the base precipitated with NaHCO₃ and recrystallized after isolation from the 10-fold amount of cyclohexane, yielding 35.4 g. (84% of the theory) 7[β-(methyl-β' - hydroxyethylamino) - γ - diisobutylamino - propyl]-theophylline, M.P. 113° C.

By reaction with equimolar amounts of maleic acid in isopropanol, the corresponding maleate, M.P. 157–158° C., was prepared.

Example 2.—7-[β-(bis-β'-hydroxyethylamino)-γ-diisobutylamino]-theophylline 38.4 g. (β-chloro-γ-diisobutylamino-propyl)-theophylline were dissolved in 105 g. diethanolamine and heated to 190–200° C. for 3.5 hours. Then the excess diethanolamine was removed by distillation at 1 torr, the residue rediossolved as in Example 1, and the crude base purified by recrystallization from acetic ester yielding 33.0 g. (73% of the theory) 1-[β-(bis-β'-hydroxyethylamino)-γ-diisobutylamino-propyl]-theophylline, M.P. 139–140° C.

The maleate of this compound had a melting point of 154–155° C.

Example 3.—7-[β-(methyl-β'-hydroxyethylamino)-γ-di-n-butylamino-propyl]-theophylline According to Example 1, from 7-(β-hydroxy-γ-di-n-butylaminopropyl)-theophylline the 7-(β-chloro-γ-di-n-butylaminopropyl)-theophylline was prepared, M.P. 81–82° C. (petrolether) and from the latter the 7-[β-(methyl-β' - hydroxyethylamino) - γ - di - n - butylamino - propyl]-theophylline was obtained, M.P. 113–114° C. (after recrystallization from cyclohexane).

Example 4.—7-[β-(4'-(β''-hydroxyethyl)-piperazino)-γ-diisobutylamino-propyl]-theophylline 38.4 g. of 7-(β-chloro-γ-diisobutylamino-propyl)-theophylline were mixed with 29 g. of 4-β'-hydroxyethyl-piperazine and heated to 150–160° C. for 5 hours. The reaction product was redissolved according to Example 1 yielding 39 g. (82% of the theory) of β-(4'-(β''-hydroxyethyl)-piperazino) derivative, M.P. 55–57° C.

What is claimed is:
1. A compound having the formula

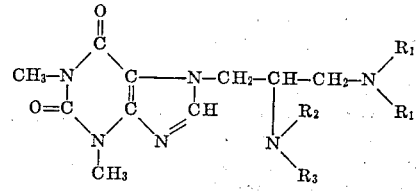

wherein $R_1$ is n-butyl or isobutyl, $R_2$ is a hydroxyalkyl group having up to 3 carbon atoms and $R_3$ is selected from the group consisting of alkyl having up to 3 carbon atoms and hydroxyalkyl having up to 3 carbon atoms, and $R_2$ and $R_3$ together with the adjacent nitrogen atom form a piperazine ring having a hydroxyalkyl group of up to three carbon atoms attached to the other nitrogen atom.

2. A compound according to claim 1 wherein $R_1$ is selected from the group consisting of n-butyl and isobutyl, $R_2$ is β-hydroxyethyl and $R_3$ is selected from the group consisting of methyl, ethyl and β-hydroxyethyl.

3. A compound according to claim 1 wherein $R_1$ is selected from the group consisting of n-butyl and isobutyl and

is 4-(hydroxyethyl)-piperazine.

4. A compound according to claim 1 which is 7-[β-(methyl - β' - hydroxyethyl) - amino - γ - diisobutylpropyl]-theophylline.

5. A compound according to claim 1 which is 7-[β-(bis - β' - hydroxyethyl) - amino - γ - diisobutylaminopropyl]-theophylline.

6. A compound according to claim 1 wherein $R_2$ is hydroxyalkyl having 2 to 3 carbon atoms and $R_3$ is a 1 to 2 carbon atom alkyl.

7. A compound according to claim 1 wherein $R_2$ and $R_3$ each is hydroxyalkyl having 2 to 3 carbon atoms.

References Cited

FOREIGN PATENTS 1,018,869  11/1957  Germany.

ALEX MAZEL, *Primary Examiner.*
ANNE MARIE T. TIGHE, *Assistant Examiner.*

U.S. Cl. X.R.

260—999